July 22, 1958 M. W. LUTZ ET AL 2,844,006
POST DRIVER ATTACHMENT
Filed March 7, 1955
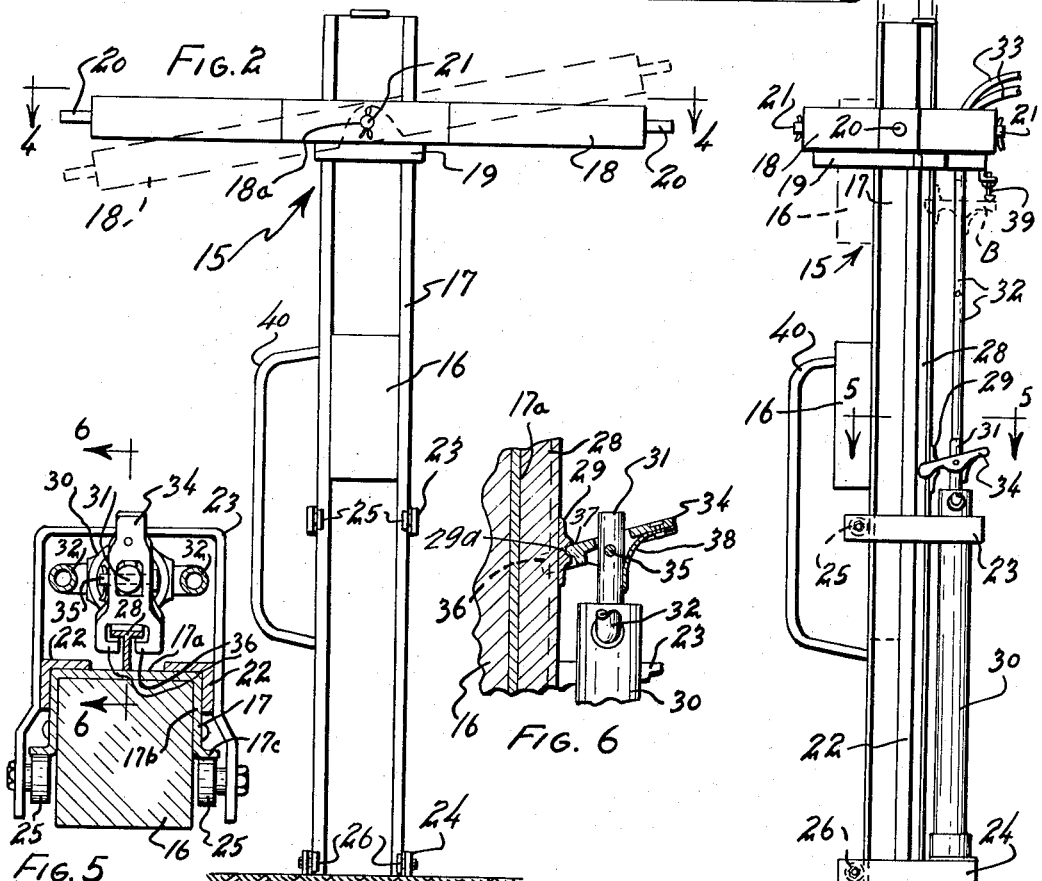
INVENTORS
MAC. W. LUTZ
WALTER W. WOLFE
ROBERT C. JOHNSON
BY Williamson, Schroeder,
Adams & Meyers ATTORNEYS United States Patent Office 2,844,006
Patented July 22, 1958

2,844,006

POST DRIVER ATTACHMENT

Mac W. Lutz, Minneapolis, Walter W. Wolfe, Mound, and Robert C. Johnson, Hopkins, Minn., assignors to Superior Separator Company, Hopkins, Minn., a corporation of Delaware Application March 7, 1955, Serial No. 492,488

8 Claims. (Cl. 61—73)

This invention relates to post drivers and more specifically relates to an attachment for tractors for driving posts in a substantially vertical position regardless of the contour of the ground into which the post is driven and upon which the tractor stands.

An object of our invention is the provision of a novel post driver attachment for tractors and the like which will position itself in a plumb position without regard to the slope of the land upon which the tractor stands.

Another object of our invention is the provision of an improved post driver of relatively simple and inexpensive construction and operation which utilizes a weight which falls in a free and unhindered manner for driving a post with substantially maximum efficiency.

A still further object of our invention is to provide a new post driver attachment for tractors which is readily and easily vertically shiftable to provide a maximum of distance of free fall travel of the post-driving weight and therefore provide a maximum impact on the post for each cycle of operation of the post driver regardless of the distance the post extends above the ground surface.

A further object of our invention is the provision of a post driver attachment for tractors of the type for maintaining itself in plumb position in substantially any tilted position of the tractor, which attachment has a source of hydraulic power releasably attached to the post-driving weight for raising the same and permitting free falling thereof.

These and other objects and advantages of our invention will more fully appear from the following description made in connection with the accompanying drawings wherein like reference characters refer to the same or similar parts throughout the several views and in which:

Fig. 1 is a side elevation view of a conventional type farm tractor having our invention attached thereto;

Fig. 2 is a front elevation view of a portion of our post-driving attachment shown in detached relation from the tractor;

Fig. 3 is a side elevation view of the post driving attachment shown in Fig. 2;

Fig. 4 is a section view taken on a substantially horizontal plane at 4—4 of Fig. 2;

Fig. 5 is a detail section view of a portion of the invention taken on a horizontal plane substantially at 5—5 of Fig. 3; and Fig. 6 is a detail section view taken on a substantially vertical plane and indicated at 6—6 of Fig. 5.

The attachment is adapted to be mounted on and used with a mobile power implement such as a tractor, designated in general by letter T, which provides a source of power and which supports the attachment. The tractor will have, as is conventional, a source of hydraulic fluid pressure which may comprise a conventional controllable pressure pump driven by the tractor engine.

Means are provided for supporting an attachment on the tractor, and in the form shown, the attachment support which is designated in general by numeral 10, comprises a pair of elongated rigid booms 11 which extend longitudinally and forwardly of the tractor and which are adapted to be secured thereto to permit the forward end portions 11a thereof to shift vertically. Booms 11 may be swingably secured to the tractor frame adjacent the rear axle thereof and may be provided with controllable power lift means such as hydraulic cylinders 12 which are swingably attached to the tractor frame adjacent to the rear axle thereof for vertical swinging movement. Hydraulic cylinders 12 have piston rods 13 swingably attached to booms 11 and also have a fluid connection (not shown) to the source of hydraulic fluid pressure. Booms 11 are also provided at the front end portion 11a thereof with conventional trunnion bearings 14 which are aligned and which are disposed on opposite sides of the tractor for carrying an attachment therebetween. Means are thereby provided for controllably raising and lowering the attachment which may be secured to the attachment support 10.

The post driving attachment which is designated in general by numeral 15, has a weighted impact hammer 16, or drop hammer which is vertically shiftable and which, in the form shown, is fixedly secured to a vertically disposed elongated guide channel 17. Hammer 16 may be of any suitable form and in the form shown is constructed of an elongated block of steel which extends longitudinally of channel 17 and is disposed medially between the upper and lower ends thereof. Channel 17 has a bottom or rear wall 17a and also has a pair of opposed side walls 17b. Each of the side walls 17b is provided with an out-turned flange or lip 17c.

Means are provided for swingably mounting hammer 16 and channel 17 on the attachment support 10 for permitting the hammer and channel to swing, as a pendulum, to a plumb position. Such means include a yoke frame 18, a support frame 19 and means for releasably connecting the vertically shiftable hammer 16 and channel 17 to the support frame 19. In the form shown, yoke frame 18 is of substantially elongated hexagonal shape and may be formed integrally into a one-piece unit by welding the elements of the frame together. Trunnion means are provided at the opposite ends of yoke frame 18 for swingably mounting the same in the trunnion bearings 14 of the attachment support 10 and in the form shown such trunnion means include trunnions 20 mounted to swing on a common axis which extends centrally of yoke frame 18. Yoke frame 18 will thereby be substantially symmetrical about the axis of swinging oscillation thereof.

Support frame 19 may also be constructed as a one-piece unit as by welding the elements thereof together and, in the form shown, support frame 19 is of a substantially rectangular shape. Support frame 19 is provided with a pair of aligned pivots 21 extending outwardly from the opposite ends thereof and being swingably mounted in suitable pivot bearings 18a in yoke frame 18. Pivots 21 define an axis of swinging movement of the support frame 19 which extends in a substantially normal direction relative to the axis of swinging of yoke frame 18. The axis of pivots 21 will extend generally longitudinally of the tractor T.

Means are provided on support frame 19 for guiding the longitudinal movement of hammer 16 and channel 17. Such guide means will include, as best shown in Figs. 3 and 5, a pair of elongated guide members 22 which comprise angle irons and which are affixed in spaced and generally mutually opposed relation to support frame 19 as by welding and in a depending position therefrom. Guide members 22 engage the side and rear walls of channel 17 for guiding the same and hammer 16 in movement longitudinally of the guide members 22 and in a substantially vertical direction. A pair of frame elements 23 and 24 are affixed to guide members 22 for interconnecting the same and for respectively retaining the intermediate and lower end portions thereof in fixed relation relative to each other. Frame elements 23 and 24 are of substantially U-shape with the open end portions thereof extending forwardly along and adjacent to channel 17 and weight 16. Rollers 25 and 26 are respectively journalled on the outer end portions of frame elements 23 and 24, and rollers 27 are journalled in support frame 19 adjacent channel 17 which extends upwardly therethrough. All of the rollers engage the out-turned lip or flange portion 17c of channel 17 for guiding the same in vertical movement and for retaining channel 17 in engagement with the guide members 22.

Means are also provided for releasably interconnecting support frame 19 with hammer 16 and channel 17 and such means include hammer-lifting means. An elongated T-shaped rail 28 extends longitudinally of channel 17 and is fixedly secured thereto as by welding, with the flanged portion of the rail disposed in substantially parallel relation with the bottom 17a of channel 17. Rail 28 extends substantially the full length of channel 17. A double-acting hydraulic cylinder 30 which has an extendible and retractible piston rod at drive member 31, is mounted on support frame 19 and in the form shown cylinder 30 is fixedly secured to frame element 24 and extends upwardly therefrom centrally through frame element 23 adjacent to and substantially parallel to guide members 22 and rail 28. Piston rod 31 is extendible in a direction substantially parallel to rail 28 into proximity with support frame 19. Hydraulic cylinder 30 is also provided with fluid communication means connectable to the source of hydraulic fluid pressure on tractor T, which means, in the form shown, comprise pipes 32 which extend upwardly therefrom to support frame 19 and flexible hoses 33 which are connected to the pipes 32 and which extend to the tractor source of hydraulic fluid pressure.

A shiftable latch member 34 provides a releasable connection between piston rod 31 and rail 28. In the form shown, as best shown in Figs. 5 and 6, latch member 34 is swingably mounted by pivot 35 on piston rod 31 in a substantilaly transverse position relative thereto. Latch member 34, which extends toward rail 28, is provided with a pair of inner and outer rigid jaws 36 and 37 respectively, which are disposed on opposite sides of the flanged portion of rail 28 and in spaced relation therewith. Outer jaw 37 includes a friction element or shoe 29 which slidably engages rail 28 and is shiftable, with swinging of latch member 38, into frictional engagement with rail 28 for restricting movement of piston rod 31 with respect to rail 28. A swingable connection is provided between friction shoe 29 and latch member 34 by notch 29a in shoe 29 which receives latch member 34 therein. Resiliently yieldable means, including spring 38 are interposed between latch member 34 and piston rod 31. Spring 38 resiliently urges latch member 34 into gripping position with respect to rail 28. An abutment 39 or release element is affixed to support frame 19 adjacent to the upper limit of vertical travel of latch member 34 for engaging the outer end portion thereof and causes the same to swing to a substantially horizontal position whereupon keeper 29 and latch member 34 will release rail 28 to permit hammer 16 to fall freely.

An elongated handle member 40 may be secured to one of the guide members in an upright position to permit manual swinging or moving of the guide members and the course of vertical travel of hammer 16.

In operation the attachment support and post driving attachment will be secured to the tractor substantially as shown. The jaws of latch member 34, including friction shoe 29 will be in gripping relation to rail 28, and hammer 16 and channel 17 will be thereby precluded from shifting downwardly beyond the lower frame element 24. Hydraulic cylinder 12 will then be actuated to raise the attachment support, thereby raising the post driver 15 from the ground. Because the axes of the pivots 21 and the trunnions 20 are disposed at substantially right angles to each other and because the hammer and channel and supporting mechanism are mounted centrally of support frame 19 with their combined center of gravity substantially in a common plane with the axis of trunnions 20 and also in a common plane with the axis of pivots 21, the guide members 22 will swing to a plumb position so as to cause the line of vertical travel of channel 17 and hammer 16 to be substantially plumb. Guide members 22 will remain in plumb position regardless of the slope and contour of the terrain on which tractor T stands, trunnions 22 permitting forward and rearward oscillation with respect to the tractor and pivots 21 permitting lateral swinging wtih respect to the tractor.

A post will thereupon be set upon the surface of the ground in a substantially vertical position at a point on the ground surface where a post is desired to be driven and then the tractor with the elevated post driver will be driven into a position so as to cause channel 17 to partially encircle the upright post. Hammer 16 will thereupon be above the post in driving position. Booms 11 will thereupon be shifted vertically to adjust the vertical position so that hammer 16 will engage the top of the post. Hydraulic cylinder 30 will thereafter be actuated to cause extension of the piston rod 31 and a corresponding upward movement of hammer 16 and channel 17. As piston rod 31 approaches its upper limit of vertical travel, latch member 34 will engage abutment 39 and be swung thereby into dotted position B thereof to cause the jaws thereof to release their grip on rail 28. Hammer 16 will be thereby released to freely fall downwardly in a plumb direction onto the top of the post. As hammer 16 falls, rails 28 will fall therewith and slide downwardly with respect to latch member 34 and friction element 29. As hammer 16 falls it will be guided by the guide members 22 and rollers 25. Hydraulic cylinder 30 will then be actuated again to retract piston rod 31 and to slide latch element 34 and shoe 29 downwardly along rail 28. Spring 38 will thereupon urge latch member 34 and shoe 29 into gripping position on rail 28.

By successive cycles of operation of raising the hammer and thereafter letting it drop onto the post, the post will be driven into the ground thereby lowering the top of the post toward the ground. Booms 11 will be correspondingly lowered to lower the post driver so as to cause hammer 16 to engage, substantially at its lower limit of falling, the top of the post, and also to permit raising of the hammer a maximum distance above the post so as to impact the post with substantially maximum driving force. As the post is progressively driven into the ground, the post driver will be lowered to a position wherein the lower frame element 24 will engage the ground and wherein the lower end portion of channel 17 will nearly strike the ground as it falls with hammer 16. The booms 11 may thereafter be raised to lift the post driver off the ground for transporting the same to a new location for driving another post and for again allowing the post driver to swing to a plumb position regardless of the slope or contour of the terrain upon which the tractor stands.

During the operation of the post driver, while the same is driving a post into the ground, the driving force exerted by the hammer will always be in a vertical direction because the guide members and hammer will maintain themselves in a plumb position by swinging of pivots 21 and trunnions 20.

It will be seen that we have provided a new and improved post driver attachment for use with a mobile implement which will remain in substantially plumb position to drive and exert impacting force against a post in substantially vertical direction irregardless of the slope of the ground into which the post is being driven and upon which the mobile implement stands.

It should also be noted that we have provided a post driver, the impact hammer of which is completely released from any mechanism during its downward impacting stroke which might hinder or retard such falling movement and thereby the hammer will exert substantially maximum impacting force against the post being driven.

It should also be apparent that we have provided a post driving attachment for tractors and the like which is vertically shiftable to control the vertical positions of the limits of vertical movement of the hammer, thereby permitting a maximum length of hammer falling while the post is being started into the ground as well as when the post has nearly reached its desired final position.

It will, of course, be understood that various changes may be made in the form, detail, arrangement and proportion of the parts without departing from the scope of our invention which consists of the matter described herein and set forth in the appended claims.

What we claim is:

1. In apparatus for use with a tractor having a source of power and an attachment support, a post driver attachment having in combination a support frame, elongated guide members affixed to said support frame and depending therefrom, swingable interconnecting means connected with said frame and connectible to such an attachment support for supporting said frame thereon and permitting pendulum swinging of said guide members into plumb position, a weighted hammer element below the support frame and guided for vertical movement by said guide members, hammer-lifting means secured to said support frame and having flexible power-transmitting means adapted to be connected to such a source of power, said hammer-lifting means including a rigid drive element shiftably mounted adjacent said hammer element for movement longitudinally of said guide members, and a latch member movably mounted on one of said elements and releasably connected to the other of said elements for raising said hammer element when power is supplied to said hammer-lifting means, whereby when said hammer element has been elevated said latch member may be moved to release and permit free falling of said hammer element.

2. In apparatus for use with a mobile implement having a source of power and an attachment support, a post driver attachment having in combination a support frame, elongated guide members affixed to said support frame and depending therefrom, swingable interconnecting means connected with said frame and connectible with such an attachment support for supporing the frame thereon and permitting pendulum swinging of said guide members into plumb position, a weighted hammer guided for vertical movement by said guide members, an elongated rail fixedly secured to said hammer and extending longitudinally of said guide members, hammer-lifting means secured to said support frame and having flexible power-transmitting means adapted to be connected to such a source of power, said hammer-lifting means including a drive element shiftably mounted for movement longitudinally of and adjacent to said rail, and a latch member pivotally mounted on said drive element, said latch member having a pair of opposed jaws disposed on opposite sides of said rail and being shiftable with pivotal swinging of said latch member into frictional gripping engagement therewth, for raising said hammer when power is supplied to said hammer-lifting means, whereby when said hammer has been elevated, said latch member may be swung to release the rail and hammer and permit free falling thereof.

3. The structure recited in claim 2 wherein said drive element and latch member are shiftable into proximity with said support frame, and said support frame having an abutment thereon disposed for engaging and swinging said latch member into released relation with the rail when the latch member is shifted upwardly with said drive element to elevate said hammer, whereby shifting of said latch member into engagement with said abutment will cause swinging of the latch member and a resultant releasing and free falling of said hammer.

4. The structure recited in claim 2 and including a spring connected between said drive element and said latch member and resiliently urging said latch member into gripping engagement with said rail for substantially locking said drive element and said rail together until the hammer is raised to the desired height, whereupon said latch member may be swung to release said hammer and rail.

5. A post driver attachment for a mobile implement having a source of power, comprising a pair of elongated and laterally spaced booms adapted to be vertically swingably mounted on such an implement and to extend forwardly thereof, said booms having forward ends with trunnion bearings therein, control means for adjusting the booms, a yoke frame extending between the forward ends of said booms and having trunnions mounted in said bearings, a support frame pivotally mounted on said yoke frame and centrally thereof for swinging movement on an axis extending transversely of said trunnions, a plurality of elongated guide members affixed to said support frame and depending therefrom, an impact hammer guided for substantially vertical sliding movement by said guide members, an elongated rail fixedly secured to said hammer and extending longitudinally of said guide members, a hydraulic cylinder mounted on said frame and having a piston rod shiftable longitudinally of said rail, said cylinder being connectible to such a source of power, and a latch member swingably mounted on said piston rod and releasably connected with said rail for raising said rail and hammer when said hydraulic cylinder is actuated, whereby when said hammer has been elevated, said latch member may be swung to release said rail and hammer and thereby permit said hammer to freely fall.

6. A post-driving attachment for use with a tractor having a source of power, and having in combination a pair of booms adapted to extend longitudinally of the tractor and outwardly therefrom, said booms having outer end portions with aligned trunnion bearings therein, and said booms being constructed for permitting generally vertical shifting of the outer end portions thereof, controllable power lift means connected to said booms and being connectible to such a tractor and to such a source of power for adjusting the vertical position of the outer end portions of said booms, a yoke frame having trunnion means carried in said trunnion bearings for swingably mounting said yoke frame on said booms, a support frame pivotally mounted on said yoke frame to oscillate on an axis extending substantially normal to said trunnion means, a plurality of guide members affixed to said support frame and depending therefrom, and an impact hammer carried by said support frame and guided for free falling movement by said guide members, whereby when said attachment is mounted on such a tractor, said guide members and hammer will swing to a plumb position below said support frame and the outer end portions of said booms may be shifted to adjust the vertical position of said support frame and guide members above the ground to correspond to the height of the top of the post above the ground and thereby permit said hammer to be raised and fall a maximum distance with respect to the post as the same is driven into the ground.

7. In apparatus for use with a tractor having a source of power and an attachment support, a post driver attachment having in combination a support frame, elongated guide members affixed to said support frame and depending therefrom, swingable interconnecting means including a hook frame pivotally connected to said support frame, and said hook frame having trunnions adapted to be swingably mounted on such an attachment support for oscillation about an axis extending transversely of the axis of relative pivotal movement between said hook frame and said support frame and thereby permitting pendulum swinging of said guide member into plumb position, a weighted hammer element guided for vertical movement by said guide members, hammer-lifting means secured to said support frame and having flexible power-transmitting means adapted to be connected to such a source of power, said hammer lifting means including a rigid drive element shiftably mounted adjacent said hammer element for movement longitudinally of said guide members, and a latch member movably mounted on one of said elements and releasably connected to the other of said elements for raising said hammer element when power is supplied to said power-lifting means, whereby when said hammer element has been elevated, said latch member may be moved to release and permit free falling of the hammer element.

8. In apparatus for use with a mobile implement having a source of power and an attachment support, a post driver attachment having in combination a support frame, elongated guide members affixed to said support frame and depending therefrom, swingable interconnecting means connected with said frame and connectible with such an attachment support for supporting the frame thereon and permitting pendulum swinging of said guide members into plumb position, a weighted hammer element guided for vertical movement by said guide members, hammer-lifting means secured to said support frame and having flexible power-transmitting means adapted to be connected to such a source of power, said hammer-lifting means including a drive element shiftably mounted adjacent said hammer element for movement longitudinally of said guide members, and a latch member pivotally mounted on one of said elements and having a pair of opposed jaws engageable with the other of said elements and being pivotally swingable into frictional gripping engagement therewith for receiving said hammer when power is supplied to the hammer-lifting means, whereby when said hammer has been elevated, said latch member may be swung to release the rail and hammer and permit free falling thereof.

References Cited in the file of this patent

UNITED STATES PATENTS

| | | |
|---|---|---|
| 2,096,943 | Templeton | Oct. 26, 1937 |
| 2,378,131 | Dirksen | June 12, 1945 |
| 2,557,873 | Jarrell | June 19, 1951 |
| 2,593,186 | Richardson | Apr. 15, 1952 |
| 2,711,078 | Guild | June 21, 1955 |